United States Patent
Yang et al.

(10) Patent No.: US 9,608,918 B2
(45) Date of Patent: Mar. 28, 2017

(54) ENABLING CONCURRENT OPERATION OF TAIL-DROP AND PRIORITY-BASED FLOW CONTROL IN NETWORK DEVICES

(71) Applicant: BROCADE COMMUNICATIONS SYSTEMS, INC., San Jose, CA (US)

(72) Inventors: Ling Yang, Pleasanton, CA (US); Ravi Swamy, Santa Clara, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 70 days.

(21) Appl. No.: 14/512,950

(22) Filed: Oct. 13, 2014

(65) Prior Publication Data

US 2015/0109928 A1    Apr. 23, 2015

Related U.S. Application Data

(60) Provisional application No. 61/894,698, filed on Oct. 23, 2013.

(51) Int. Cl.
| | |
|---|---|
| H04L 1/00 | (2006.01) |
| H04L 12/851 | (2013.01) |
| H04L 12/823 | (2013.01) |
| H04L 12/863 | (2013.01) |
| H04L 12/869 | (2013.01) |
| H04L 12/935 | (2013.01) |
| H04L 12/931 | (2013.01) |
| H04L 12/861 | (2013.01) |

(52) U.S. Cl.
CPC .......... *H04L 47/2441* (2013.01); *H04L 47/32* (2013.01); *H04L 47/60* (2013.01); *H04L 47/627* (2013.01); *H04L 47/6255* (2013.01); *H04L 49/30* (2013.01); *H04L 49/505* (2013.01); *H04L 49/9084* (2013.01)

(58) Field of Classification Search
None
See application file for complete search history.

(56) References Cited

U.S. PATENT DOCUMENTS

| | | | |
|---|---|---|---|
| 8,312,188 B1 | 11/2012 | White et al. | |
| 8,520,522 B1 * | 8/2013 | Goldman | ....................... 370/235 |
| 2007/0104102 A1 * | 5/2007 | Opsasnick | .............. H04L 47/10 |
| | | | 370/230 |
| 2008/0285580 A1 * | 11/2008 | Yotsumoto | .............. H04L 45/60 |
| | | | 370/412 |

(Continued)

OTHER PUBLICATIONS

Lama: "Understanding Enhanced Transmission Selection"; IEEE 802.1Qaz; Mar. 23, 2011; pp. 1-8.

(Continued)

*Primary Examiner* — Bob Phunkulh
(74) *Attorney, Agent, or Firm* — Fountainhead Law Group P.C.

(57) ABSTRACT

In one embodiment, a network device is provided that includes a plurality of ports, where each port is associated with a plurality of traffic classes for prioritizing traffic received on the port. The network device further includes a packet buffer memory, an ingress traffic management engine, and an egress traffic management engine. The network device is configured to allow, for each port, concurrent operation of tail-drop and priority-based flow control (PFC) with respect to different traffic classes of the port.

18 Claims, 6 Drawing Sheets

(56) References Cited

U.S. PATENT DOCUMENTS

| | | | | |
|---|---|---|---|---|
| 2009/0245104 A1* | 10/2009 | Nishimura | .............. | H04L 47/10 |
| | | | | 370/230 |
| 2011/0199907 A1* | 8/2011 | Zheng | ................... | H04L 1/1685 |
| | | | | 370/235 |
| 2012/0057601 A1* | 3/2012 | Voruganti | ............... | H04L 49/10 |
| | | | | 370/401 |

OTHER PUBLICATIONS

International Search Report and Written Opinion for International Appln. No. PCT/US2014/061632 dated Feb. 6, 2015, 11 pages.

Brocade: "FastIron Ethernet Switch"; Traffic Management Guide; Supporting FastIron Software Release 08.0.00; dated Apr. 30, 2013; Brocade Communications Systems, Inc., 76 pages.

"Traffic Management on the QFX Series"; Juniper Networks, Inc.; Release 12.2; Published Sep. 6, 2012; 482 pages.

"Traffic Management on the QFX Series"; Juniper Networks, Inc.; Release 13.2; Published May 12, 2014; 720 pages.

* cited by examiner

ENABLING CONCURRENT OPERATION OF TAIL-DROP AND PRIORITY-BASED FLOW CONTROL IN NETWORK DEVICES

CROSS REFERENCES TO RELATED APPLICATIONS

The present application claims the benefit and priority under 35 U.S.C. 119(e) of U.S. Provisional Application No. 61/894,698, filed Oct. 23, 2013, entitled "TWO SHARED BUFFER POOLS AND HIERARCHICAL SCHEDULER." The entire contents of this provisional application are incorporated herein by reference for all purposes.

BACKGROUND

As known in the field of computer networking, tail-drop is a traffic management technique implemented by network devices such as routers and switches for handling congestion caused by loss-tolerant (i.e., lossy) traffic. When tail-drop is enabled on a network device for a given traffic class, the network device monitors the depths of egress queues that are associated with the traffic class. If the depth of a particular egress queue exceeds a predefined tail-drop threshold, the network device drops any further packets destined for that egress queue until its queue depth falls back below the threshold.

In contrast to tail-drop, priority-based flow control, or PFC (defined in IEEE standard 802.1Qbb), is a traffic management technique that is implemented by network devices for handling congestion caused by loss-sensitive (i.e., lossless) traffic. When PFC is enabled on a network device for a given ingress port P and traffic class TC 1, the network device monitors the usage of ingress buffers that are associated with TC 1. If TC 1 traffic received on P causes the ingress buffer usage to exceed a predefined PFC threshold (also known as an XOFF value), the network device transmits a PAUSE frame to the traffic sender (i.e., the device connected to P). The PAUSE frame causes the traffic sender to stop sending traffic corresponding to TC 1 for a specified period of time, thereby allowing the ingress buffer congestion on the receiving network device to subside (without having to drop any packets).

In conventional network devices, packet buffer memory is typically shared across ingress buffers and egress queues, for all ports and traffic classes. In such a shared memory model, the memory requirements for tail-drop and PFC are in direct conflict. For example, with tail-drop, it is desirable to allocate a large amount of packet buffer space to the egress queues, which reduces the amount of available memory for the ingress buffers. This allows the network device to absorb traffic bursts on the egress side with minimal packet loss. On the other hand, with PFC, it is generally desirable to allocate a large amount of packet buffer space to the ingress buffers, which reduces the amount of available memory for the egress queues. This ensures that there is sufficient headroom on the ingress side to hit the PFC ingress buffer threshold (and thereby trigger sending of the PAUSE frame), as well as buffer in-flight packets that are transmitted by the sender before it is able to pause transmission.

These conflicting memory requirements mean that conventional network devices cannot properly support tail-drop and PFC for different traffic classes (or the same traffic class on different ports) at the same time. To understand this, consider a scenario where tail-drop is enabled for traffic class TC 0 and PFC is enabled for traffic class TC 1, both on port P. The enablement of PFC for TC 1 should, in theory, guarantee that TC 1 traffic is not dropped (i.e., remain lossless) when congestion occurs. However, assume that the network device has a total shared packet buffer memory of 12 megabytes (MB), and the volume of traffic for TC 0 causes the egress queues associated with TC 0 to consume 10 MB. In this case, if the PFC ingress buffer threshold is set at 3 MB, that threshold will never be hit for TC 1, since there is only 2 MB available for ingress buffers. This, in turn, means that excess traffic for TC 1 will be dropped on the ingress side once ingress buffer usage exceeds 2 MB (because a PAUSE frame is never transmitted to the traffic sender), thereby violating the guarantee that TC 1 traffic remain lossless.

SUMMARY

In one embodiment, a network device is provided that includes a plurality of ports, where each port is associated with a plurality of traffic classes for categorizing traffic received on the port. The network device further includes a packet buffer memory, an ingress traffic management engine, and an egress traffic management engine. The network device is configured to allow, for each port, concurrent operation of tail-drop and PFC with respect to different traffic classes of the port.

The following detailed description and accompanying drawings provide a better understanding of the nature and advantages of particular embodiments.

DETAILED DESCRIPTION

Figure 1:
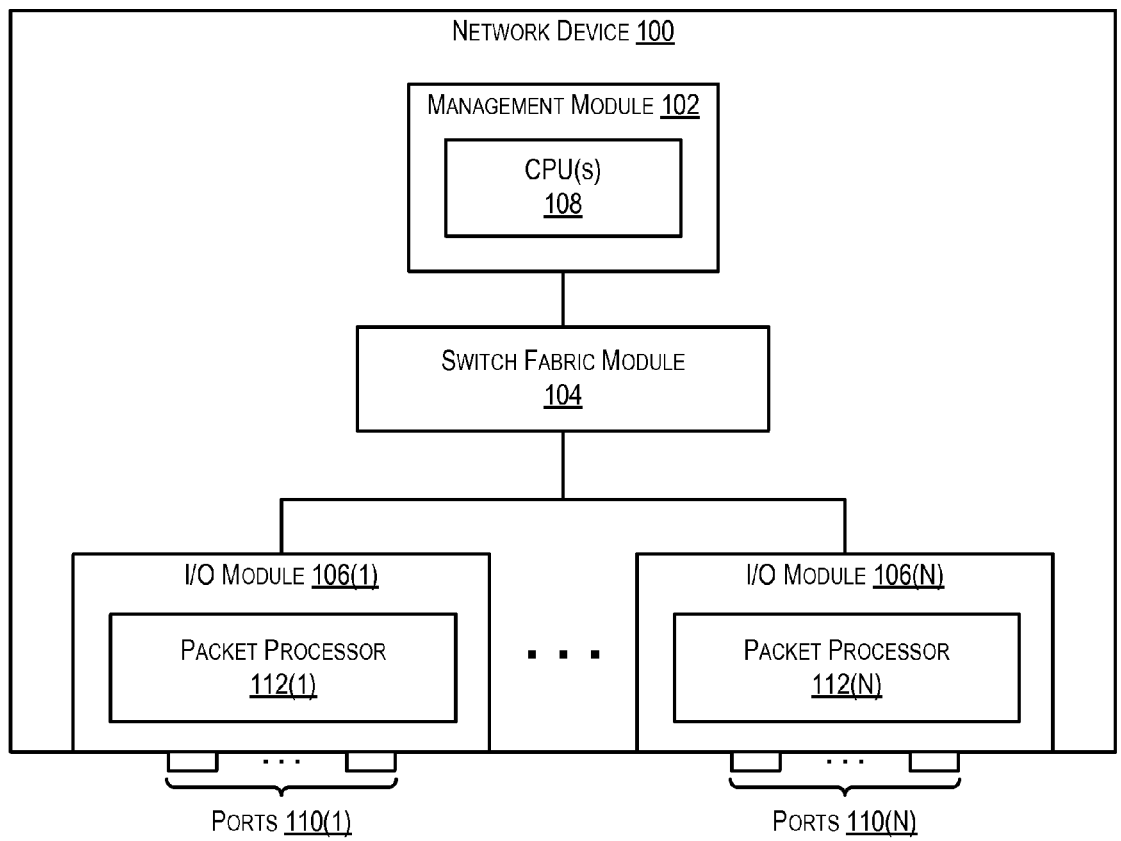
FIG. 1 depicts a network device according to an embodiment.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

The present disclosure describes techniques that can be implemented within the packet processor of a network device for enabling concurrent operation of tail-drop and PFC (referred to herein as mixed tail-drop/PFC functionality) by the device. For example, in one embodiment, these techniques can allow a device administrator to enable tail-drop for a traffic class on a first port of the network device, and simultaneously enable PFC for the same traffic class on a second port of the device. Alternatively, the device administrator can simultaneously enable tail-drop and PFC for two different traffic classes respectively on the same port of the device. As known in the art, a "traffic class" (TC) is a classification for categorizing network traffic; for example, there are eight standard TCs (0-7) for Ethernet traffic under the IEEE 802.1Q standard.

At a high level, the techniques of the present invention enable mixed tail-drop/PFC functionality by partitioning the packet buffer memory of the packet processor into four distinct pools: a lossy ingress pool, a lossless ingress pool, a lossy egress pool, and a lossless egress pool. The lossy ingress and egress pools are mapped to [port, traffic class] pairs that have tail-drop enabled, and the lossless ingress and egress pools are mapped to [port, traffic class] pairs that have PFC enabled. Incoming traffic is then buffered in the appropriate pools using these mappings. For example, assume [port A, TC 0] is configured to use tail-drop, while [port A, TC 1] is configured to use PFC. In this scenario, an ingress packet received on port A and corresponding to TC 0 would be buffered in the lossy ingress pool on the ingress side and in the lossy egress pool on the egress side. Conversely, an ingress packet received on port A and corresponding to TC 1 would be buffered in the lossless ingress pool on the ingress side and in the lossless egress pool on the egress side.

By segregating packets into separate buffer pools in this manner, the conflicting buffer memory requirements of tail-drop and PFC can be avoided since lossy traffic (i.e., traffic that should be handled via tail-drop) will not consume buffer space allocated for lossless traffic (i.e., traffic that should be handled via PFC) and vice versa. This, in turn, allows tail-drop and PFC to be enabled concurrently on the network device, without raising the danger of inadvertently dropping lossless traffic.

In certain embodiments, to support the foregoing architecture, each egress port can be associated with two different egress queue groups: a lossy queue group comprising one lossy egress queue per traffic class, and a lossless queue group comprising one lossless egress queue per traffic class. For instance, if there are N traffic classes, there will be N×2 egress queues for each egress port (N in the lossy group and N in the lossless group). The queues in each lossy queue group can be allocated from the lossy egress pool, while the queues in each lossless queue group can be allocated from the lossless egress pool. With this configuration, packets that share the same traffic class but differ in terms of whether that are lossy or lossless will go to different queues on the egress side.

In further embodiments, a hierarchical (e.g., two-stage) scheduler can be implemented at each egress port that schedules the transmission of packets out of the egress port in view of the lossy/lossless queue group configuration noted above.

These and other features of the present invention and described in further detail in the sections that follow.

2. Network Device

FIG. 1 depicts an exemplary network device 100 according to an embodiment of the present invention. Network device 100 can be, e.g., a network switch, a network router, or the like.

As shown, network device 100 includes a management module 102, a switch fabric module 104, and a number of I/O modules 106(1)-106(N). In one embodiment, each module 102, 104, and 106(1)-106(N) can be implemented as a blade that is insertable into (or removable from) one of a plurality of modular slots in the chassis of network device 100. In this way, network device 100 can accommodate any number of these modules according to differing network topologies and requirements. In other embodiments, modules 102, 104, and 106(1)-106(N) can be fixed in-place (i.e., non-upgradable).

Management module 102 represents the control plane of network device 100 and includes one or more management CPUs 108 that execute the management and/or control functions of device 100. Each management CPU 108 can be a general purpose microprocessor, such as a PowerPC, Intel, AMD, or ARM microprocessor, that operates under the control of software stored in an associated memory (not shown).

Switch fabric module 104 and I/O modules 106(1)-106(N) collectively represent the data, or forwarding, plane of network device 100. Switch fabric module 104 interconnects the various other modules of network device 100 so that they can communicate with each other as intended. I/O modules 106(1)-106(N) comprise components for handling the transmission and receipt of data packets. For example, each I/O module 106(1)-106(N) includes ingress/egress ports 110(1)-110(N) that can send/receive packets at different speeds including 1 Gigabit per second, 10 Gigabits per second, 40 Gigabits per second, 100 Gigabits per second, or more. Each I/O module 106(1)-106(N) also includes a packet processor 112(1)-112(N), which is a hardware-based component (e.g., an FPGA or ASIC) configured to make wire speed decisions on how to process incoming and outgoing data packets. In certain embodiments, each packet processor 112(1)-112(N) can be enhanced to support mixed tail-drop/PFC functionality as described in Section (3) below.

It should be appreciated that network device 100 is illustrative and not intended to limit embodiments of the present invention. Other configurations having more or fewer components than shown in FIG. 1 are possible. For example, while the configuration of FIG. 1 is typical for a chassis-based network device, in other embodiments network device 100 can be a fixed form-factor (e.g., "pizza box" type) device. In such a fixed-form factor network device, there may be a single management module that is directly connected to a single I/O module (without an intermediary switch fabric module). Fixed-form factor devices are generally not upgradable like chassis-based devices, but some fixed-form factor devices can be interconnected to form a stacking system that operates as a single, logical device. One of ordinary skill in the art will recognize many variations, modifications, and alternatives.

3. Packet Processor Architecture

Figure 2:
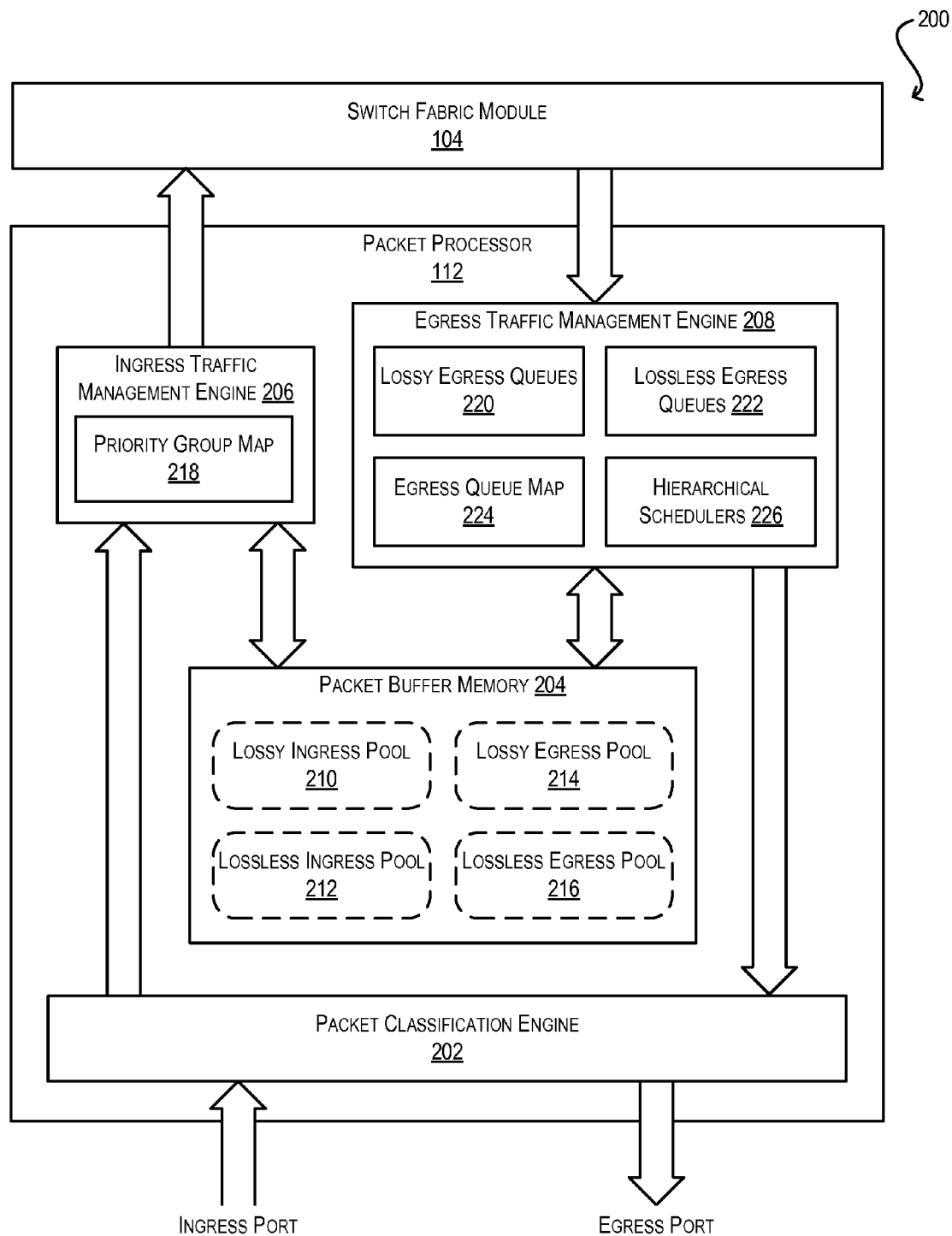
FIG. 2 depicts a packet processor architecture according to an embodiment.

FIG. 2 depicts a more detailed view 200 of packet processor 112 of network device 100 according to an embodiment. In particular, FIG. 2 depicts an embodiment of packet processor 112 that supports mixed tail-drop/PFC functionality. As shown, packet processor 112 includes a packet classification engine 202 that is communicatively coupled with an ingress traffic management (TM) engine 206 and an egress TM engine 208. Ingress TM engine 206 and egress TM engine 208 are, in turn, coupled with a packet buffer memory 204. In embodiments where network device 100 is a fixed-form factor device, packet processor 112 may also include a pre-egress engine (not shown) between ingress TM engine 206 and egress TM engine 208 for communicating packets between those two engines.

In a conventional network device, packet buffer memory is typically shared across all ingress buffers and egress queues (for all ports and traffic classes) of the device. In other words, all ingress buffers and egress queues are allocated from the same pool of memory, without any mechanism to differentiate lossy traffic from lossless traffic. As explained in the Background section, if tail-drop and PFC were allowed to be enabled simultaneously in such a conventional network device, there may be instances where lossless traffic on a PFC-enabled port/traffic class is inadvertently dropped (due to the conflicting memory requirements of tail-drop or PFC).

To address these and other similar issues, packet buffer memory 204 in FIG. 2 is divided into four separate pools: a lossy ingress pool 210, a lossless ingress pool 212, a lossy egress pool 214, and a lossless egress pool 216. In one embodiment, this division may be implemented programmatically via software. In other embodiments, this division may be implemented physically at the hardware level.

Lossy ingress pool 210 can be associated with one or more lossy priority groups (not shown), which are mapped (via a priority group map 218 maintained by ingress TM engine 206) to [port, traffic class] pairs configured to use tail-drop. Similarly, lossy egress pool 214 can associated with lossy egress queues 220, which are mapped (via an egress queue map 224 maintained by egress TM engine 208) to [port, traffic class] pairs configured to use tail-drop.

On the other hand, lossless ingress pool 212 can be associated with one or more lossless priority groups (not shown), which are mapped (via priority group map 218) to [port, traffic class] pairs configured to use PFC. Similarly, lossless egress pool 216 can be associated with lossless egress queues 222, which are mapped (via egress queue map 224) to [port, traffic class] pairs configured to use PFC.

When a packet is received at an ingress port of packet processor 112, packet classification engine 202 can first process the packet to determine its traffic class and the egress port of network device 100 that it should be forwarded out of. Packet classification engine 202 can then pass the packet to ingress TM engine 206 to handle buffering of the packet on the ingress side. If the [ingress port, traffic class] for the packet has tail-drop enabled, ingress TM engine 206 can determine, based on priority group map 218, that the packet should be buffered in lossy ingress pool 210 (since the [ingress port, traffic class] pair will be mapped to a priority group that is associated with pool 210). Lossy ingress pool 210 will not have any PFC ingress buffer threshold in effect because such an ingress threshold is not needed/desired for tail-drop mode.

Conversely, if the [ingress port, traffic class] for the packet has PFC enabled, ingress TM engine 206 can determine, based on priority group map 218, that the packet should be buffered in lossless ingress pool 212 (since the [ingress port, traffic class] pair will be mapped to a priority group that is associated with pool 212). Lossless ingress pool 212 will have a PFC ingress buffer threshold in effect.

Further, once the packet has been sent over switch fabric module 104 (or a pre-egress engine) and received at an egress packet processor of network device 100 (which may be the same or different from the ingress packet processor), egress TM engine 208 can handle buffering of the packet on the egress side. If the [ingress port, traffic class] for the packet has tail-drop enabled, egress TM engine 208 can determine, based on egress queue map 224, that the packet should be buffered in a lossy egress queue 220 for the egress port that is allocated from lossy egress pool 214 (since the [ingress port, traffic class] pair will be mapped to that queue 220). Lossy egress queue 220 will have a tail-drop threshold in effect.

Conversely, if the [ingress port, traffic class] for the packet has PFC enabled, egress TM engine 208 can determine, based on egress queue map 224, that the packet should be buffered in a lossless egress queue 222 for the egress port that is allocated from lossless egress pool 216 (since the [ingress port, traffic class] pair will be mapped to that queue 222). Lossless egress queue 222 will not have any tail-drop threshold in effect, since such an egress threshold is not needed/desired for PFC.

Figure 3:
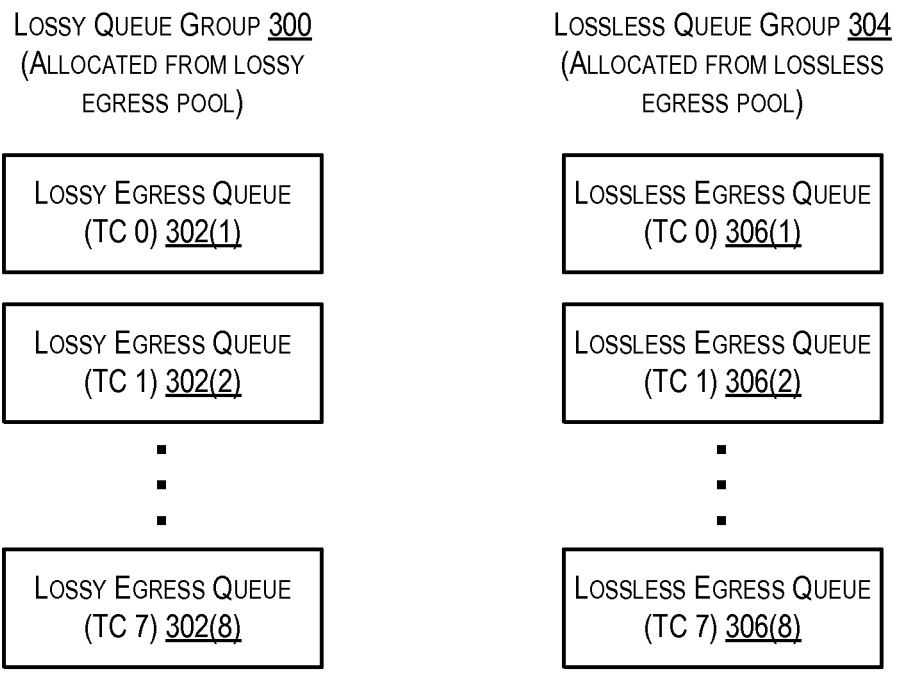
FIG. 3 depicts a lossy egress queue group and a lossless egress queue group according to an embodiment.

Finally, egress TM engine 208 can schedule (via a per-port hierarchical scheduler 226) transmission of the buffered packet out of its intended egress port and towards its next destination. In a particular embodiment, there is one group of lossy egress queues 220 and one group of lossless egress queues 222 per egress port, with each group including one queue for each traffic class supported by network device 100. For example, FIG. 3 depicts a lossy queue group 300 and a lossless queue group 304 for a given egress port, assuming that the device supports eight traffic classes. As shown, lossy queue group 300 includes eight lossy egress queues 302(1)-302(8) (corresponding to TC 0-TC 7) and lossless queue group 304 includes eight lossless egress queues 306(1)-306(8) (corresponding to TC 0-TC 7).

In accordance with this configuration, hierarchical scheduler 226 of FIG. 2 can comprise two stages—a first stage to select between the lossy and lossless queue groups, and a second stage to select between the traffic classes—in order to carry out its scheduling function. The operation of hierarchical scheduler 226 is described in further detail with respect to FIG. 5 below.

With the architecture shown in FIG. 2 and discussed above, packet processor 112 can effectively segregate traffic from lossy sources (which are intended to be handled via tail-drop) and traffic from lossless sources (which are intended to be handled via PFC) in packet buffer memory 204. This means that there is no contention for packet buffer resources between tail-drop and PFC, and thus these modes can be enabled concurrently on a per [port, traffic class] basis on network device 100, without any concern that lossless traffic will be dropped. For instance, a device administrator can enable PFC for traffic classes 5, 6, and 7 on port A, leaving traffic classes 0 through 4 on port A (and all traffic classes 0-7 on other ports) available for concurrently running tail-drop mode.

This capability is advantageous because different ports/applications of network device 100 may have different traffic management requirements (e.g., a port connected to a server or SAN storage may need to guarantee lossless operation and thus may want to enable PFC for certain traffic classes, while an uplink port connected to another network switch may want to absorb micro-bursts and thus enable tail-drop for the same, or different, traffic classes). By allowing for concurrent tail-drop and PFC operation, embodiments of the present invention provide users/administrators the flexibility to configure the network device in a manner that supports these differing requirements.

4. Packet Processing Workflow

Figure 4A:
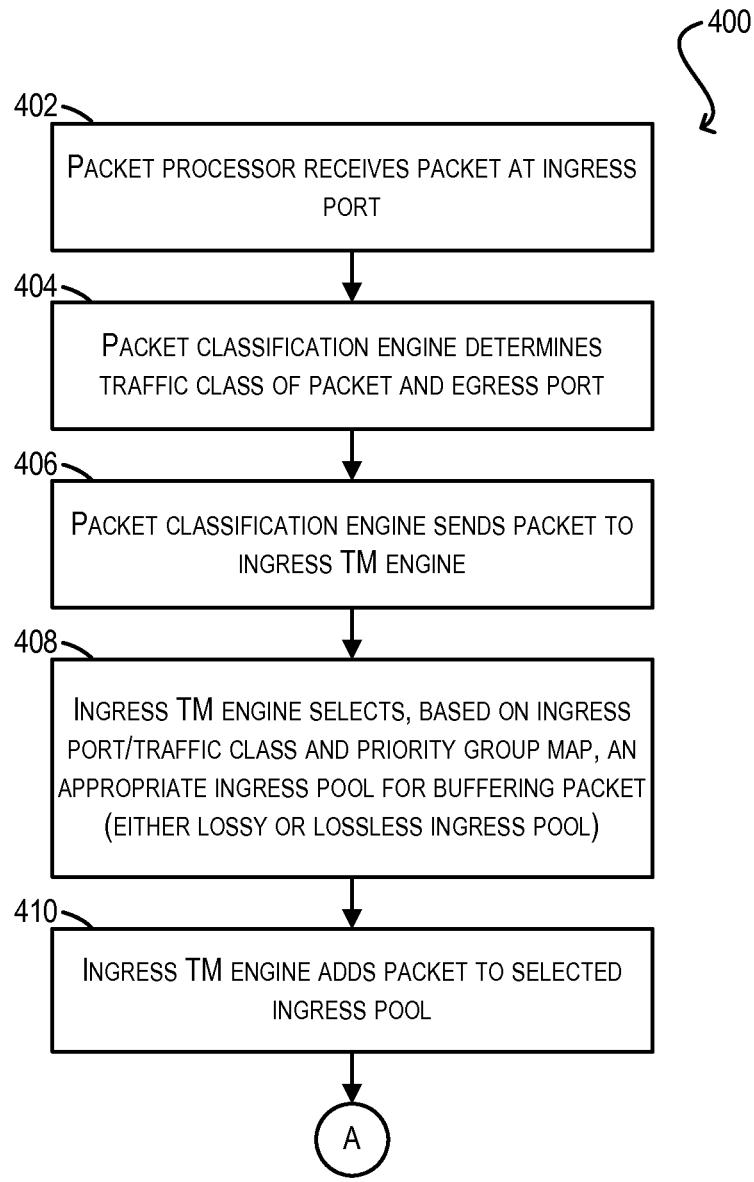
FIGS. 4A and 4B depict a packet processing workflow according to an embodiment.
Figure 4B:
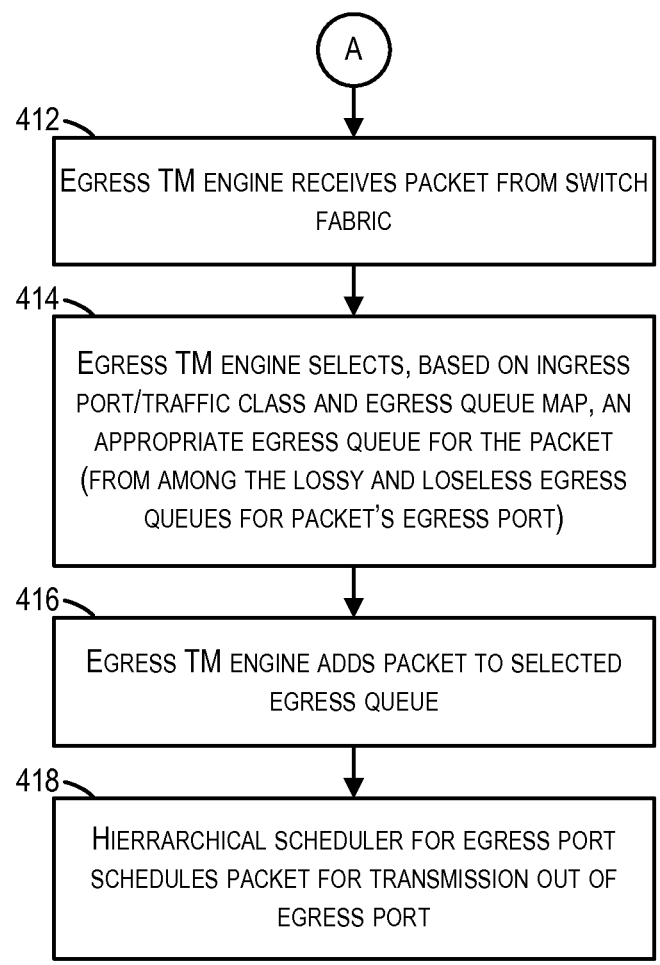

FIGS. 4A and 4B depict an ingress-to-egress packet processing workflow 400 that can be carried out by packet processor 112 of FIG. 2 to support mixed tail-drop/PFC functionality according to an embodiment. Workflow 400 assumes that a device administrator has enabled tail-drop for certain [port, traffic class] pairs on network device 100 and enabled PFC for other [port, traffic class] pairs on network device 100.

Starting with block 402, packet processor 112 can receive a packet at an ingress port of network device 100. For example, packet processor 112 may receive a packet on port A.

At block 404, packet classification engine 202 of packet processor 112 can determine (based on, e.g., the packet's Ethernet header) a traffic class for the packet, as well as the appropriate egress port for forwarding the packet out of device 100. For example, assume that packet classification engine 202 determines the packet's traffic class to be TC 0, and the egress port for the packet to be port B. Packet classification engine 202 can then send the packet to ingress TM engine 206 (block 406).

Upon receiving the packet, ingress TM engine 206 can select, based on the packet's ingress port/traffic class and priority group map 218, an appropriate ingress pool (either lossy pool 210 or lossless pool 212) for buffering the packet on the ingress side (block 408). For instance, if the device administrator has enabled tail-drop for [port A, TC 0], this port/traffic class pair will be mapped to a priority group that is associated with lossy ingress pool 210. Thus, ingress TM engine 206 can store the packet in one or more ingress buffers in lossy ingress pool 210 (block 410). As noted previously, lossy ingress pool 210 does not have any PFC ingress threshold enabled because pool 210 is meant only for lossy traffic.

Alternatively, if the device administrator has enabled PFC for [port A, TC 0], this port/traffic class pair will be mapped to a priority group that is assigned to lossless ingress pool 212. Thus, ingress TM engine 206 can store the packet in one or more ingress buffers in lossless ingress pool 212 (block 210). As noted previously, lossless ingress pool 210 does have a PFC ingress threshold enabled to ensure that a PAUSE frame is sent to the traffic sender when the threshold is hit (indicating congestion at the receiving device).

Turning now to FIG. 4B, at some subsequent point in time, the packet can be removed from the ingress buffer pool, sent over switch fabric module 104 (or a pre-egress engine), and received at an egress TM engine 208 of an egress packet processor (block 412). Upon receiving the packet, egress TM engine 208 can select, based on the packet's ingress port/traffic class and egress queue map 224, an appropriate egress queue (either a lossy egress queue 220 or a lossless egress 222) for buffering the packet on the egress side (block 414). For instance, if the device administrator has enabled tail-drop for [port A, TC 0], this port/traffic class pair will be mapped (via egress queue map 224) to a lossy egress queue 220 that is allocated from lossy egress pool 214. Thus, egress TM engine 208 can add the packet to this lossy egress queue (block 416). As noted previously, lossy egress queues 220 have a threshold enabled to support tail-drop mode.

Alternatively, if the device administrator has enabled PFC for [port A, TC 0], this port/traffic class pair will be mapped (via egress queue map 224) to a lossless egress queue 222 that is allocated from lossless egress pool 216. Thus, egress TM engine 208 can add the packet to this lossless egress queue (block 416). As noted previously, lossless egress pool 216 does not have any tail-drop threshold enabled because pool 216 is meant only for lossless traffic.

Figure 5:
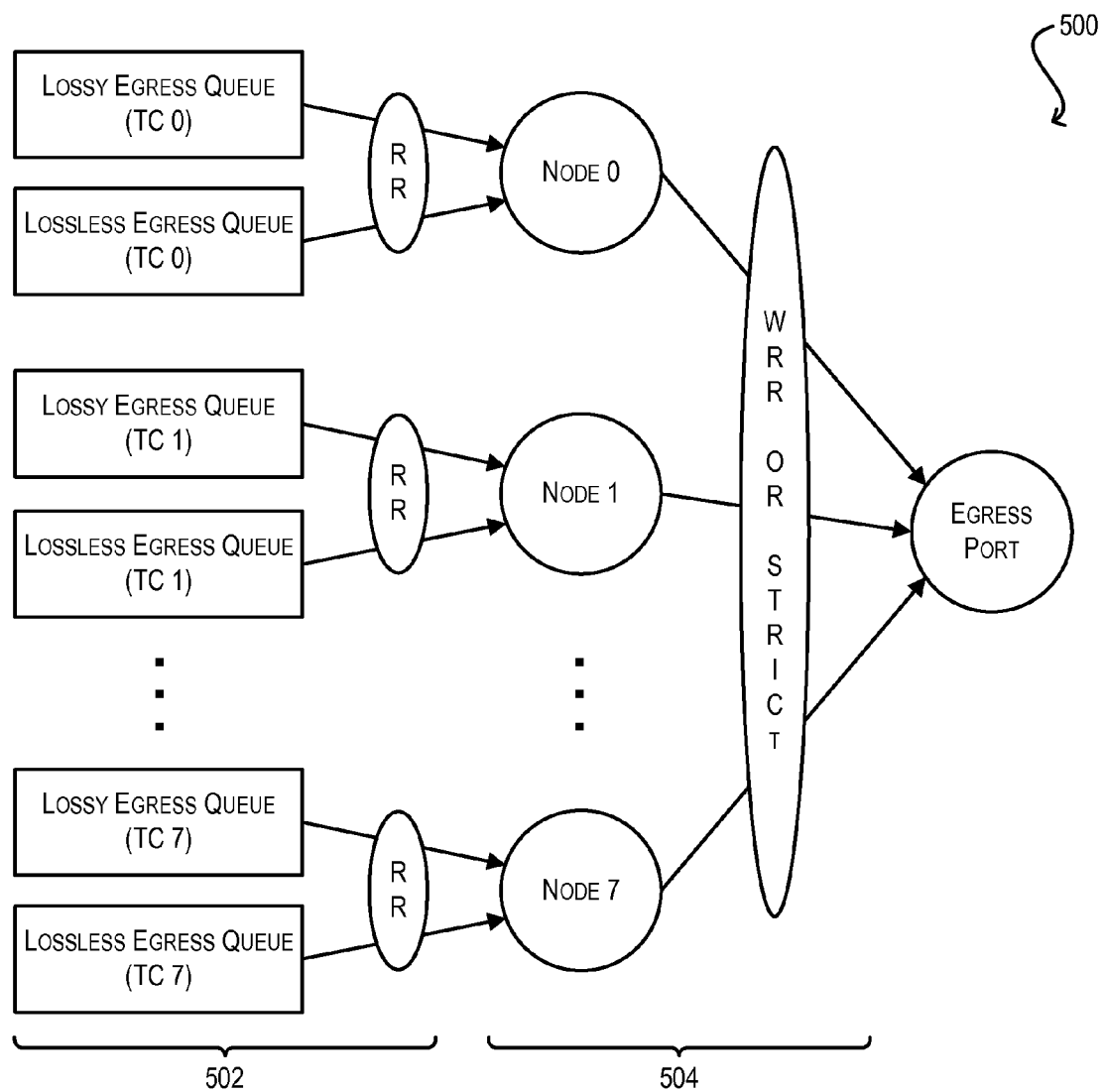
FIG. 5 depicts a hierarchical scheduler according to an embodiment.

Then, at block 418, egress TM engine 208 can invoke the hierarchical scheduler 226 for the egress port in order to schedule the buffered packet for transmission out of the egress port. FIG. 5 depicts an example structure 500 for hierarchical scheduler 226 according to an embodiment. In this example, it is assumed that there are eight TCs 0-7.

As shown in FIG. 5, structure 500 includes two stages: a first stage 502 and a second stage 504. In stage 502, hierarchical scheduler 226 first selects, for each TC 0-7, a packet from the TC's lossy egress queue or lossless egress queue using a round-robin (RR) algorithm. In stage 504, hierarchical scheduler 226 selects a packet from among the output of the RR selectors of stage 502 using a weighted round-robin (WRR) algorithm or a strict algorithm. Finally, the selected packet at the end of stage 2 is transmitted out of the egress port. With this two-stage design, hierarchical scheduler 226 can properly support multiple egress queues (one lossy and one lossless) per traffic class.

It should be noted that while FIG. 5 depicts the use of specific selection algorithms (e.g., RR, WRR, strict, etc.) at each stage of hierarchical scheduler 226, other types of selection algorithms may be used depending on the design goals of the scheduler. For example, in some embodiments, it may be preferable to use a WRR algorithm at stage 502 in order to give greater priority to either the lossy or lossless queue. Further, the selection algorithms can be configured to enforce, e.g., minimum or maximum bandwidth guarantees with respect to the lossy/lossless queues or with respect to certain TCs. One of ordinary skill in the art will recognize other modifications, variations, and alternatives.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A network device comprising:
    a plurality of ports, each port being associated with a plurality of traffic classes for categorizing traffic received on the port;
    a packet buffer memory comprising a lossy ingress pool and a lossless ingress pool; and
    an ingress traffic management engine-maintaining mappings between (port, traffic class) pairs and priority groups, each priority group being associated with the lossy ingress pool if the (port, traffic class) pair mapped to the priority group has tail-drop enabled and being associated with the lossless ingress pool if the (port, traffic class) pair mapped to the priority group has Priority-based Flow Control (PFC) enabled,
    wherein at a time of receiving a packet at an ingress port in the plurality of ports, the network device:

determines a traffic class of the packet;
determines a priority group for the packet based on the ingress port, the traffic class, and the mappings: and
adds the packet to either the lossy ingress pool or the lossless ingress pool based on the packet's priority group.

2. The network device of claim 1 wherein the packet buffer memory further comprises a lossy egress pool and a lossless egress pool.

3. The network device of claim 2 wherein the lossy egress pool has a tail-drop threshold in effect and wherein the lossless egress pool does not have the tail-drop threshold in effect.

4. The network device of claim 1 wherein the network device further comprises an egress traffic management engine that maintains, for each port in the plurality of ports, a first set of egress queues and a second set of egress queues, wherein the first set of egress queues is allocated from a lossy egress pool in the packet buffer memory, wherein the second set of egress queues is allocated from a lossless egress pool in the packet buffer memory, and wherein each egress queue in the first and second sets is mapped to a traffic class in the plurality of traffic classes.

5. The network device of claim 1 wherein the network device further comprises, for each port in the plurality of ports, a hierarchical scheduler for scheduling the transmission of packets out of the port.

6. The network device of claim 5 wherein a first stage of the hierarchical scheduler comprises selecting, for each traffic class in the plurality of traffic classes:
a packet from a first egress queue in a first set of egress queues allocated from a lossy egress pool in the packet buffer memory, the first egress queue corresponding to the traffic class; or
a packet from a second egress queue in a second set of egress queues allocated from a lossless egress pool in the packet buffer memory, the second egress queue also corresponding to the traffic class.

7. The network device of claim 6 wherein the selecting is performed via a round-robin algorithm, a weighted round-robin algorithm, or a strict algorithm.

8. The network device of claim 6 wherein the selecting is performed using an algorithm that is configured to enforce minimum or maximum bandwidth guarantees.

9. The network device of claim 6 wherein a second stage of the hierarchical scheduler comprises selecting, from among the packets selected in the first stage, a packet for transmission out of the port.

10. The network device of claim 9 wherein the selecting of the second stage is performed using a round-robin algorithm, a weighted round-robin algorithm, or a strict algorithm.

11. The network device of claim 9 wherein the selecting of the second stage is performed using an algorithm that is configured to enforce minimum or maximum bandwidth guarantees.

12. The network device of claim 1 wherein the network device further:
sends the packet to an egress traffic management engine for transmission out of an egress port;
selects, from among a first set of egress queues and a second set of egress queues associated with the egress port, an egress queue for buffering the packet, wherein the egress queue is selected based on the packet's traffic class and whether tail-drop or PFC is enabled for the packet's ingress (port, traffic class) pair; and
adds, via the egress traffic management engine, the packet to the selected egress queue.

13. The network device of claim 12 wherein the network device further:
removes the packet from the selected egress queue and sends the packet out of the egress port using a hierarchical scheduler.

14. The network device of claim 1 wherein the lossless ingress pool has a PFC ingress buffer threshold in effect and wherein the lossy ingress pool does not have the PFC buffer threshold in effect.

15. A method comprising:
maintaining, by a network device, a packet buffer memory comprising a lossy ingress pool and a lossless ingress pool:
maintaining, by the network device, mappings between (port, traffic class) pairs and priority groups, each priority group being associated with the lossy ingress pod if the (port, traffic class) pair mapped to the priority group has tail-drop enabled and being associated with the lossless ingress pool if the (port, traffic class) pair mapped to the priority group has Priority-based Flow Control (PFC) enabled; and
at a time of receiving a packet at an ingress port:
determining a traffic class of the packet;
determining a priority group for the packet based on the ingress port; the traffic class; and the mappings: and
adding the packet to either the lossy ingress pool or the lossless ingress pool based on the packet's priority group.

16. The method of claim 15 wherein the traffic class is selected from a group of eight traffic classes defined under the IEEE 802.1Q standard.

17. A non-transitory computer readable medium having stored thereon program code executable by a processor of a network device, the program code comprising:
code that causes the processor to maintain a packet buffer memory comprising a lossy ingress pool and a lossless ingress pool:
code that causes the processor to maintain mappings between (port, traffic class) pairs and priority groups, each priority group being associated with the lossy ingress pool if the (port, traffic class) pair mapped to the priority group has tail-drop enabled and being associated with the lossless ingress pool if the (port, traffic class) pair mapped to the priority group has Priority-based flow Control (PFC) enabled; and
code that causes the processor to, at a time of receiving a packet at an ingress port:
determine a traffic class of the packet;
determine a priority group for the packet based on the ingress port, the traffic class, and the mappings: and
add the packet to either the lossy ingress pool or the lossless ingress pool based on the packet's priority group.

18. The non-transitory computer readable medium of claim 17 wherein the traffic class is selected from a group of eight traffic classes defined under the IEEE 802.1Q standard.

* * * * *